United States Patent [19]
Pedersen et al.

[11] B 3,914,903

[45] Oct. 28, 1975

[54] APPARATUS FOR FOLLOWING A PREVIOUSLY SHAPED SURFACE OF A WORKPIECE AND FOR REMOVING STOCK FROM SUCH SURFACE WITHOUT SIGNIFICANTLY CHANGING THE SHAPE THEREOF

[75] Inventors: Harry Pedersen, Rochester; Philip F. White, Victor, both of N.Y.

[73] Assignee: The Gleason Works, Rochester, N.Y.

[22] Filed: Aug. 24, 1973

[21] Appl. No.: 391,437

[44] Published under the Trial Voluntary Protest Program on January 28, 1975 as document no. B 391,437.

[52] U.S. Cl. ............... 51/33 W; 51/237 R; 51/168; 51/DIG. 32
[51] Int. Cl.² ................. B24B 19/08; B23F 19/05
[58] Field of Search ......... 51/32, 33 W, 50 R, 50 H, 51/50 PC, 105 R, 105 EC, 236, 237 R, 240 R, 206 R, 165.93, 168

[56] References Cited
UNITED STATES PATENTS

| | | |
|---|---|---|
| 1,651,533 | 12/1927 | Maynard .............................. 51/168 |
| 1,666,746 | 4/1928 | Maynard .......................... 51/168 X |
| 1,840,254 | 1/1932 | Richardson ...................... 51/209 R |
| 1,959,900 | 5/1934 | Brown et al. ............................ 51/56 |
| 1,977,952 | 10/1934 | Offenbacher ..................... 51/206 R |
| 2,836,936 | 6/1958 | Lovely .................................. 51/50 R |
| 3,757,474 | 9/1973 | Pederson ............................. 51/33 W |

*Primary Examiner*—Al Lawrence Smith
*Assistant Examiner*—K. J. Ramsey
*Attorney, Agent, or Firm*—Ralph E. Harper

[57] ABSTRACT

The disclosure includes descriptions of a machine for bringing a grinding wheel into precise engagement with a surface of a workpiece. The grinding wheel is resiliently mounted relative to a rotatable spindle to permit limited angular displacement of its axis relative to its axis of rotation, and the workpiece is resiliently mounted relative to supporting structure so as to permit limited radial movement of the workpiece relative to the grinding wheel. This arrangement allows the grinding wheel and workpiece to precisely adjust their positions, in response to forces imparted to them by contact with a previously shaped surface of the workpiece.

7 Claims, 5 Drawing Figures

APPARATUS FOR FOLLOWING A PREVIOUSLY SHAPED SURFACE OF A WORKPIECE AND FOR REMOVING STOCK FROM SUCH SURFACE WITHOUT SIGNIFICANTLY CHANGING THE SHAPE THEREOF

BACKGROUND OF THE INVENTION

In rotary engine production, it is a practice to machine a precise shape of a combustion chamber into a workpiece. Formation of the combustion chamber includes the machining or shaping of a cylinder wall having irregularly shaped, but precisely dimensioned, contours within an internal bore of the workpiece. Certain manufacturing processes apply a hard metal coating, such as a chromium plating, onto the cylinder wall of the combustion chamber, and it is desirable to impart a final surface finish to such coatings, or to previously formed surfaces, without significantly changing the precision shape or contours established for the cylinder wall. Typically, it is desirable to remove a very small amount of stock, generally less than 0.001 inch, from the previously shaped cylinder wall, and various forms of honing processes have been attempted for this purpose.

It has been discovered that it is extremely difficult to remove uniform amounts of stock from a previously shaped and dimensioned workpiece surface without imparting a new shape or contour to the workpiece surface. In rotary piston engine production, for example, it is nearly impossible to align a surface of a combustion chamber bore with a grinding or honing wheel spindle and to then generate a final finish (by removal of very small amounts of stock) from the previously shaped surface without removing excessive material in some areas. Furthermore, very small errors, such as depthwise taper, may exist within tolerances established for a mass production manufacture of such workpieces, and it is impossible to duplicate such errors in the final finishing or honing operation required for completion of the workpiece. Finally, it has been noted that the existence of intake and exhaust ports in the chamber being finished affects uniformity of stock removal from surfaces surrounding such openings.

SUMMARY OF THE INVENTION

The present invention solves the problem discussed above by providing for a compliant relationship between a grinding wheel and a surface of a workpiece so that the grinding wheel and the workpiece can precisely adjust their positions to maintain a previously set contour or shape (including errors in contour or shape) and to thereby remove only uniform amounts of stock from the entire internal bore of the workpiece without imparting a significant change to its shape or contours.

It is known in the art to provide for a universal mounting of a honing head relative to its drive spindle, as shown for example in U.S. Pat. No. 2,998,682, and it is known to provide for a resilient mounting of individual honing elements in a honing head so that each element may adjust its position radially relative to the axis of rotation of the honing head. In contrast to such prior art arrangements, the present invention offers a unique arrangement of resilient mountings for both a working tool and a workpiece which are brought into engagement with each other for a final finishing operation which involves a generating contact between the working tool and the workpiece. Unlike prior art devices, the present invention provides for a "normal" positioning of both the working tool and the workpiece, and the working tool and workpiece can be each separately displaced from such normal position in order to maintain a predetermined force between the working tool and the workpiece. In addition, the invention provides for a preferred embodiment in which there is one form of displacement for the working tool and a second form of displacement for the workpiece so as to produce a combined effect of nearly universal compliance between the tool and the workpiece. More specifically, the working tool is mounted so that its axis may displace slightly at an angle to its axis of rotation when required to conform to a depthwise taper condition in the workpiece, and the workpiece is mounted relative to supporting means so that its axis can be displaced slightly radially from the axis of rotation of the working tool in order to develop a predetermined force between the working tool and the workpiece.

Although the invention will be described with particular reference to the specific problems encountered in rotary engine manufacture, it can be appreciated that the basic principles of the invention can be applied to many forms of precision grinding and finishing which require extremely precise following and adjustment of a working tool relative to a workpiece surface. Thus, the invention contemplates a stock removing machine of the type in which a working tool is mounted and rotated about an axis of a rotatable spindle for being brought into contact with a surface of a workpiece supported for rotation relative to the working tool, and in such a machine, the improvements of this invention comprise (a) first resilient means interconnecting the working tool with the rotatable spindle to permit limited angular displacement of the axis of the working tool relative to its axis of rotation to maintain a predetermined angular force between the working tool and the workpiece, and (b) second resilient means included in a supporting means for the workpiece to permit limited radial displacement of the workpiece relative to the axis for rotation of the working tool to maintain a predetermined radial force between the working tool and the workpiece. This arrangement allows the working tool and workpiece to precisely adjust their positions in response to forces imparted to them by a previous shape of the workpiece surface. The first or second resilient means discussed above may be used separately in a given machine assembly, if desired, however a combination of the two offers a preferred arrangement for maximum compliance between a working tool and a workpiece. In certain machining processes it may be preferred to work with compliance of only the working tool or only the workpiece. For example, in the manufacture of rotary engine housings it is sometimes preferable to provide for compliance of only the workpiece so that a non-compliant grinding tool can correct depthwise taper errors in the internal bore of such housings.

These and other features and advantages of the present invention will become apparent in a more detailed discussion which follows, and in that discussion reference will be made to the accompanying drawings, as briefly described below.

DETAILED DESCRIPTION OF INVENTION

Figure 1:
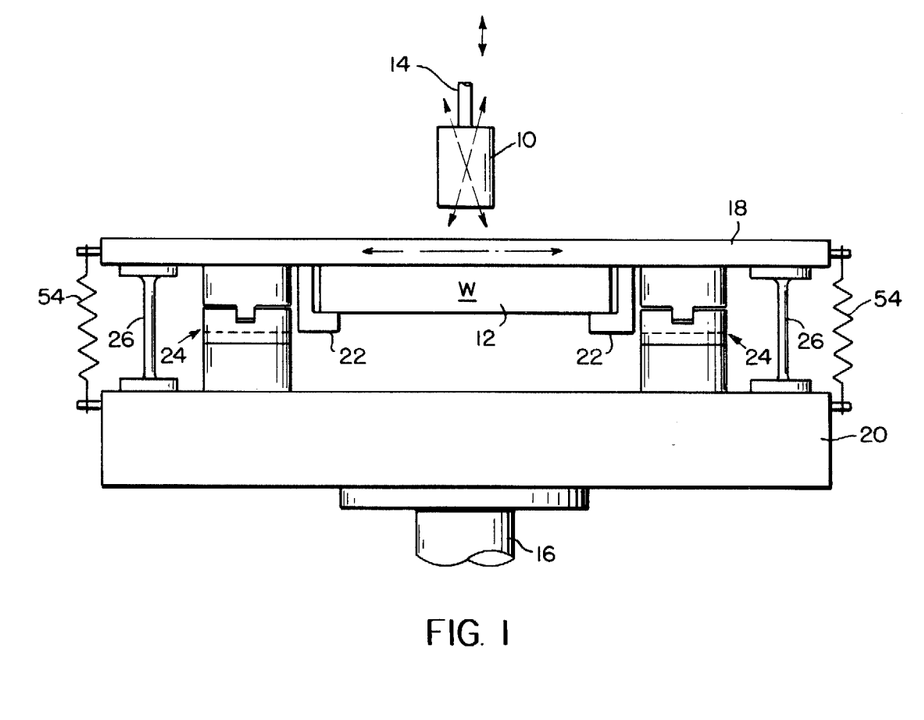
FIG. 1 is a higly schematic view of basic relationships between a working tool and a workpiece in accordance with the present invention.

FIG. 1 schematically illustrates basic relationships which can be established between a working tool 10 and a workpiece 12 in accordance with principles of the present invention. Briefly, the invention contemplates separate resilient means for mounting (a) the working tool 10 relative to a rotatable spindle means 14 associated therewith and (b) the workpiece 12 in supporting means for carrying the workpiece relative to its drive spindle 16. Only one of these separate improvements may be required in any given machine assembly, but a combination of both improvements offers maximum universal compliance between the working tool 10 and the workpiece 12. As indicated by the dashed line arrows (showing highly exaggerated displacements) in FIG. 1, the working tool is resiliently mounted to permit limited angular displacement of its axis relative to the axis of rotation of its spindle means 14. On the other hand, the workpiece 12 is resiliently mounted to permit limited radial displacement of the workpiece relative to the axis of the working tool. Thus, the working tool can be fed into engagement with an internal surface of the workpiece 12 so as to develop a sufficient pressure to remove a desired amount of stock. As the working tool and workpiece rotate relative to one another, slight changes in angular and radial forces between the two will be translated into very limited displacements of the working tool or the workpiece as a result of the compliant arrangements which have been provided.

FIG. 1 further illustrates a type of supporting means for the workpiece 12 in which a holding means 18, in the form of a support plate, is carried in a spaced position from a table means 20 so that the workpiece 12 can be suspended beneath the holding means 18 with clamping members 22. Rotational movements of the table means 20 are imparted to the holding means 18 through an Oldham type of coupling 24, however, radial displacement of the holding means 18 relative to the table means 20 is permitted by a plurality of spring elements 26.

Figure 2:
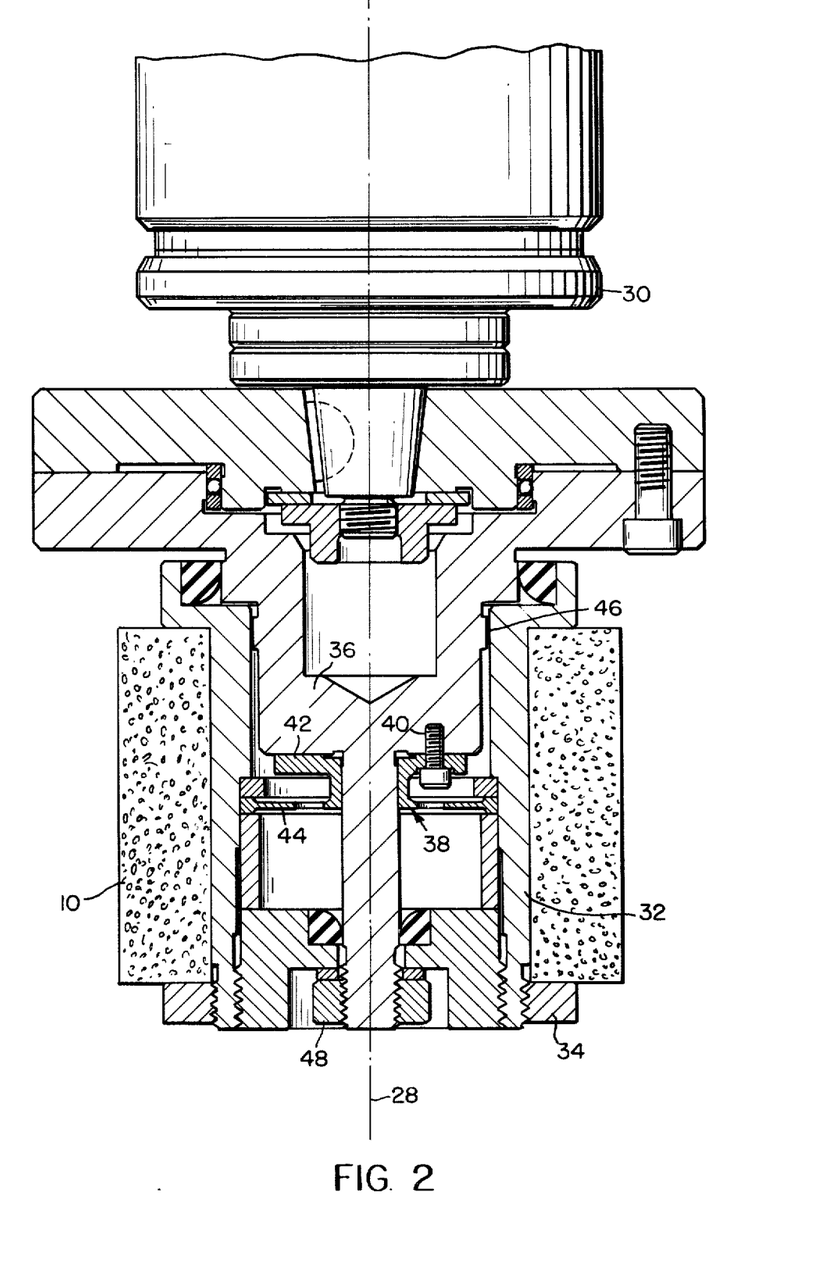
FIG. 2 is an elevational view, partly in section, of a working tool assembly which includes a first resilient means for permitting limited displacement of the working tool at an angle to its axis of rotation.
Figure 3:
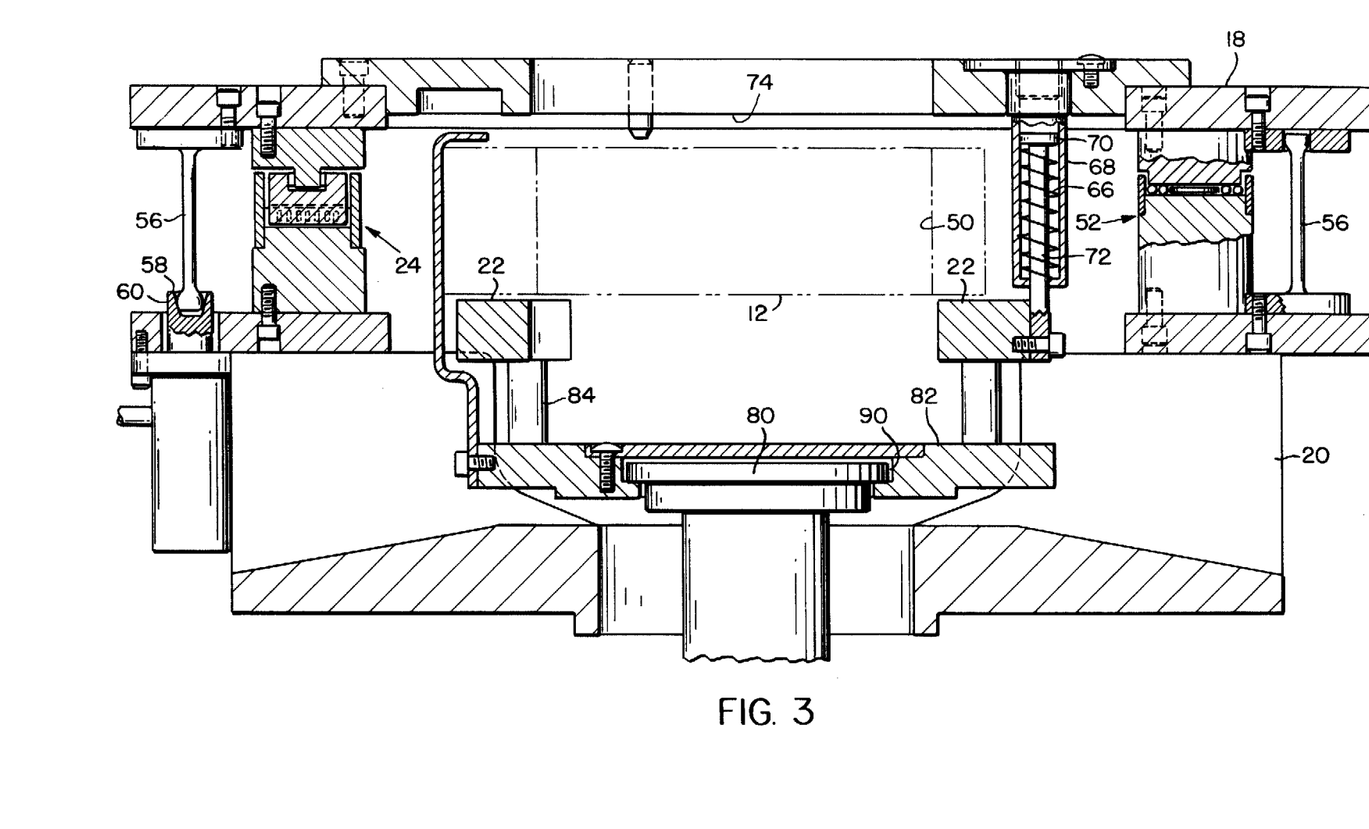
FIG. 3 is an elevational view, partly in section, of a workpiece supporting assembly (in reduced scale from what is shown in FIG. 2) which includes a second resilient means for permitting limited radial displacement of the workpiece relative to the axis of rotation of the working tool.
Figure 4:
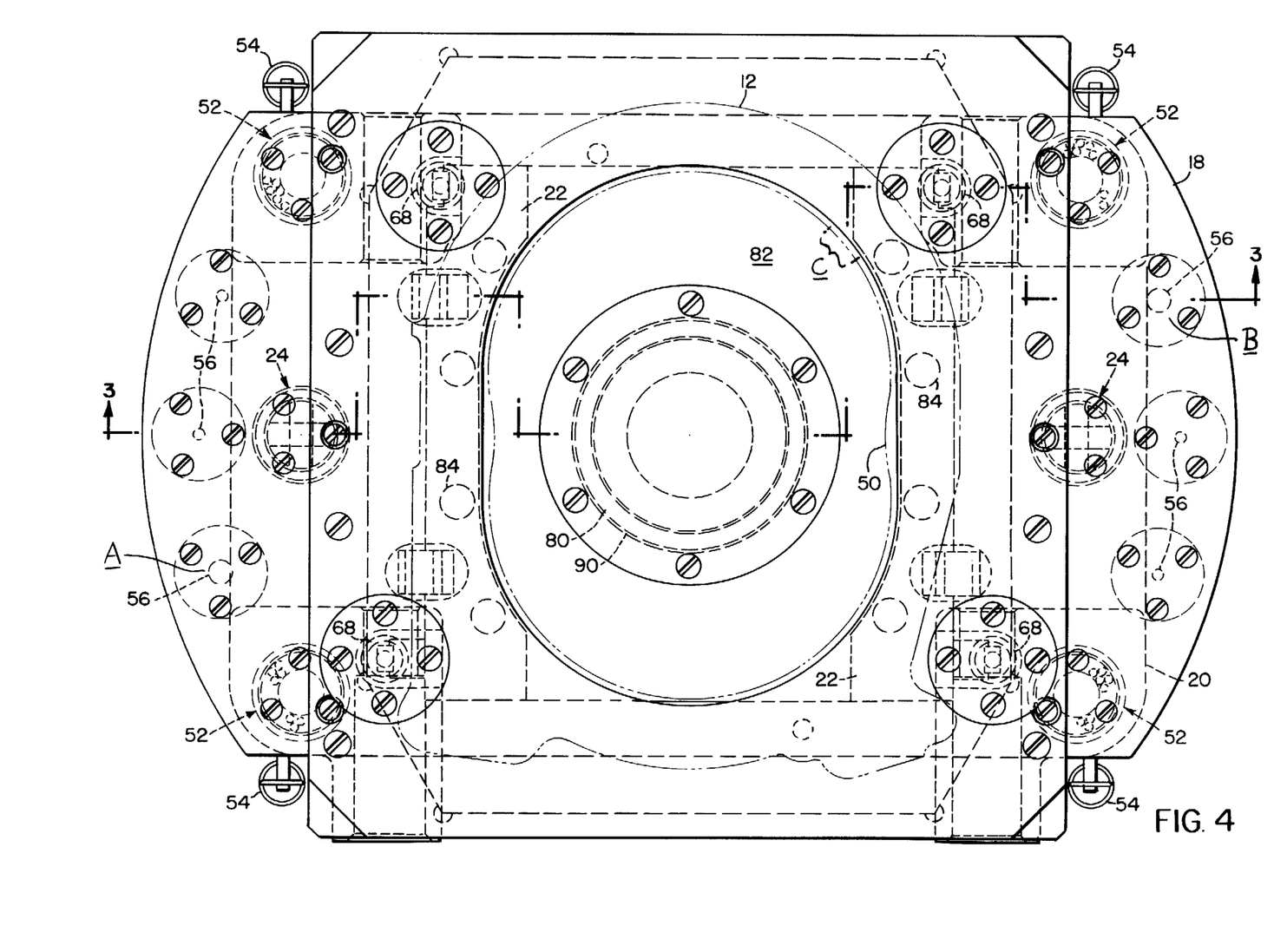
FIG. 4 is a top plan view, partly in section, of the workpiece supporting assembly illustrated in FIG. 3.

FIGS. 2–4 illustrate details of a specific embodiment of the invention as designed for a machine for grinding or finishing an epitrochoidal shape in the cylinder wall of a rotary engine housing. This type of machine is described in greater detail in co-pending application Ser. No. 180,585 (now U.S. Pat. No. 3,757,474), filed on Sept. 15, 1971 by Harry Pedersen under title "Curved Surface Generator." This type of machine provides for generation of a precise shape and size of a workpiece with a working tool which is brought into engagement with a surface of the workpiece.

Referring to FIG. 2, there is illustrated a mounting assembly for a cylindrical grinding wheel 10 which is resiliently mounted for very limited angular displacement relative to an axis of rotation 28 of a rotatable spindle means 30 and its associated structures. The cylindrical grinding wheel 10 is tightly secured to a mounting sleeve 32 and retained in position with a lock nut 34. The mounting sleeve 32, in turn, is resiliently mounted relative to an inner spindle extension 36 which is tightly secured to the rotatable spindle means 30 for rotation therewith. A resilient means 38 (hereinafter referred to as "first" resilient means in the context of a preferred embodiment in which a first resilient means is provided for the working tool and a second resilient means provided for the workpiece) in the form of a diaphragm element functions to precisely position the cylindrical grinding wheel 10 relative to the drive spindle extension 36. It can be seen that the diaphragm element 38 is secured to the drive spindle extension 36 with a plurality of fastening means 40 extending through a mounting flange portion 42 of the diaphragm element. The design of the diaphragm element 38 is such that the grinding wheel means 10 is firmly and rigidly fixed radially relative to the axis 28 of the rotatable spindle 30, but a relatively flexible portion 44 of the diaphragm element 38 permits limited axial flexibility between the grinding wheel means 10 and the rotatable spindle means. This permits very limited angular displacement of the center axis of the grinding wheel means relative to the axis of rotation 28 of the rotatable spindle means when a predetermined angular force develops between the grinding wheel means and a workpiece. The angular displacement which is provided for is extremely limited, as indicated by the relatively small clearance (between 0.0012 and 0.0016 inches, for example) provided at 46 between an inner surface of the mounting sleeve 32 of the grinding wheel means 10 and an outer surface of the drive spindle extension 36.

It is a further characteristic of the aforesaid first resilient means 38 that it tends to urge and maintain the grinding wheel 10 in a "normal" position in which its center axis is coincident with the axis of rotation 28 of the rotatable spindle means 30. Thus, the grinding wheel means 10 is normally maintained in a precisely centered condition relative to its drive spindle, but its position can be displaced very slightly in accordance with predetermined variations in force which develop between the grinding wheel means 10 and a surface of the workpiece when there is a change in depthwise taper, or similar profile condition of the workpiece surface, from what has been calculated for a particular generating cycle. This allows the grinding wheel means 10 to substantially follow extremely slight changes in workpiece profile, to achieve line contact with the workpiece, and to maintain a uniform pressure and removal of stock throughout its entire travel along a workpiece surface.

FIG. 2 also illustrates mounting structures, seals, and a fastening nut 48 for assembling the working tool components on the rotatable drive spindle 30 of the machine. These assemblies will be understood to those skilled in the art through a study of the FIG. 2 illustration.

FIGS. 3 and 4 illustrate two views of a supporting means for carrying a workpiece relative to its drive spindle in such a way that very limited radial displacement of the workpiece can take place relative to the axis of rotation of a working tool when a predetermined radial force develops between the working tool and the workpiece. This arrangement provides for a following of slight errors in size or contour in a workpiece profile being finished by the working tool. The basic components illustrated in FIGS. 3 and 4 correspond generally to the structures schematically illustrated for a workpiece supporting means in the FIG. 1 illustration.

Referring to FIG. 3, a table means 20 is connected to a main drive spindle (not illustrated) for the machine so that the workpiece 12 can be rotated in accordance with a controlled and timed cycle of operation. The workpiece 12 is carried or suspended above the table means 20 with a holding means 18. The holding means 18 is in the form of a plate having an opening through its central portion so that a grinding wheel or other working tool can be lowered into contact with an internal surface 50 of the workpiece 12. The holding means 18 is mounted on four post-like structures 52 arranged around the position of the workpiece so as to fix the spaced distance of the holding means 18 from a reference surface of the table means 20. It can be seen that each post-like structure comprises two separate post segments which are aligned with each other with bearings therebetween to permit limited lateral movement between the segments. One post segment of each structure is secured to a bottom surface of the holding means 18 and its associated other segment is secured to the table means 20. Additionally, two other post-like structures 24 are provided to permit radial displacement of the holding means 18 relative to the table means 20 while, at the same time, maintaining a direct driving relationship between the table means 20 and the holding means 18. Oldham couplings, as known in the art, are provided in the structures 24, and these couplings include crossed axis bearing surfaces (and bearing structures) to permit universal radial sliding movement of one member relative to a parallel member. The holding means 18 is urged downwardly toward the table means 20 by a plurality of spring means 54 (see FIGS. 1, 4 and 5) which extend under tension between the holding means and the table means.

Interposed between the holding means 18 and the table means 20 are a plurality (six being illustrated) of resilient means 56 (hereinafter referred to as "second" resilient means in the context of a machine assembly which combines a resilient mounting of a working tool with a resilient mounting of a workpiece) in the form of beam spring elements designed and balanced to normally maintain a precisely aligned condition between the workpiece 12 and the table means 20, but permitting a displacement from such a "normal" position when a predetermined force is required between a working tool and the workpiece. When developing such a force the workpiece overcomes the positioning effect of the total number of beam springs 56 and moves radially relative to the table means 20.

The placement of the post structures 24, 52, and the second resilient means 56 about the position of the workpiece 12 is illustrated in the FIG. 4 view.

Referring again to the spring element structures 56 illustrated in FIG. 3, there is shown a preferred arrangement for selectively controlling engagement and disengagement of individual spring elements in their operative positions between the holding means 18 and the table means 20. This is an important feature of a specific embodiment of the invention applied to finishing processes for epitrochoidal chambers in rotary engine housings. In such housings, intake and exhaust port means are typically located through the housing chamber. When a grinding wheel passes over a port portion of the chamber wall, there is a momentary increase in contact pressure between the grinding wheel and the surface areas above and below the position in the port. This pressure increase results from the decrease in length of contact between the grinding wheel and the workpiece. Typically this causes the removal of more surface material around the port and a distortion of the basic shape. Accordingly, it is desirable to be able to adjust the amount of force between the workpiece and the grinding wheel when the workpiece has rotated to a position at which the grinding wheel means is passing over a port. This is accomplished with the present invention by providing for receiving structures 58 which can be brought into and out of engagement with certain of the beam springs 56 associated with the holding means 18 (as illustrated in FIG. 3) or alternatively with the table means 20 (not illustrated). As shown in the lefthand side of FIG. 3, the individual beam spring elements are provided with free end portions having conical or spherical configurations formed thereon to mate with similarly shaped recesses formed in the receiving structures 58. Additionally, the receiving structures are fastened to or formed integrally with piston structures 60, or equivalent actuating means, for raising and lowering such receiving structures 58 into and out of engagement with the spring elements 56. This allows selected spring elements to be disengaged at desired times in a given finishing cycle so as to decrease the total spring force between the workpiece holding means 18 relative to the table means 20. Referring to the FIG. 4 illustration, it has been found that an engagement of receiving structures 58 with spring elements 56 at only the positions A and B, with a simultaneous disengagement of all remaining receiving structures, provides for a desirable adjustment of force between the grinding wheel and the workpiece when the grinding wheel is passing over an exhaust port located generally in the position C. In such a set-up, the spring elements in the A and B positions may be permanently affixed in their contact between the holding means 18 and the table means 20 (as shown for the spring element in the right-hand side of FIG. 3), if desired. Known control circuits are provided for bringing the receiving structures into and out of operative engagement between the holding means 18 and the table means 20. The spring elements 56 may be designed to offer different spring characteristics for separate elements of a plurality included in a given assembly. Each of the spring elements 56 may be shrouded to protect them from the working environment of the machine.

FIG. 3 also illustrates a clamping mechanism for clamping and unclamping the workpiece 12 relative to a reference surface defined on a bottom surface of the holding means 18. In the FIG. 3 view the workpiece 12 is in an unclamped position.

Clamping of the workpiece 12 is accomplished with spring tension from four separate coil springs 66 located at the corners of the workpiece. Each spring 66 is contained within a cylindrical housing 68 extending downwardly from, and affixed to, the holding means 18. The lower end of each spring 66 bears against an end wall surface of the housing 68, and the upper end of each spring bears against a circular plate 70 secured to the upper end of an axially movable rod element 72. A lower end of the rod element 72 is affixed to a clamping pad 22 which makes contact with the bottom of the workpiece 12. The springs 66 are designed to normally lift the load of the workpiece 12 upwardly into a clamped position against a reference surface 74 of the holding means 18. It can be seen that this is accomplished by an axial expansion of the springs 66 to lift their associated plates 70, rod elements 72 and clamping pads 22.

Unclamping of the workpiece 12 is accomplished with hydraulic actuation of a piston assembly having a pull-down flange 80 for contacting subassemblies 82 and 84 carried by the clamping assemblies 22 and associated structures discussed above. The FIG. 3 illustration shows the flange 80 in a lower limit position for unclamping the workpiece. A release of hydraulic control allows the flange to ride upwardly with an upward movement of the clamping assemblies 22 when the workpiece is drawn up against the holding means 18. Since it is necessary to provide for limited radial displacement of the holding means 18 and all of the clamping assemblies relative to the pull-down flange 80, a clearance for such displacement is provided at 90 between the outer periphery of the flange and the subassembly 82.

Figure 5:
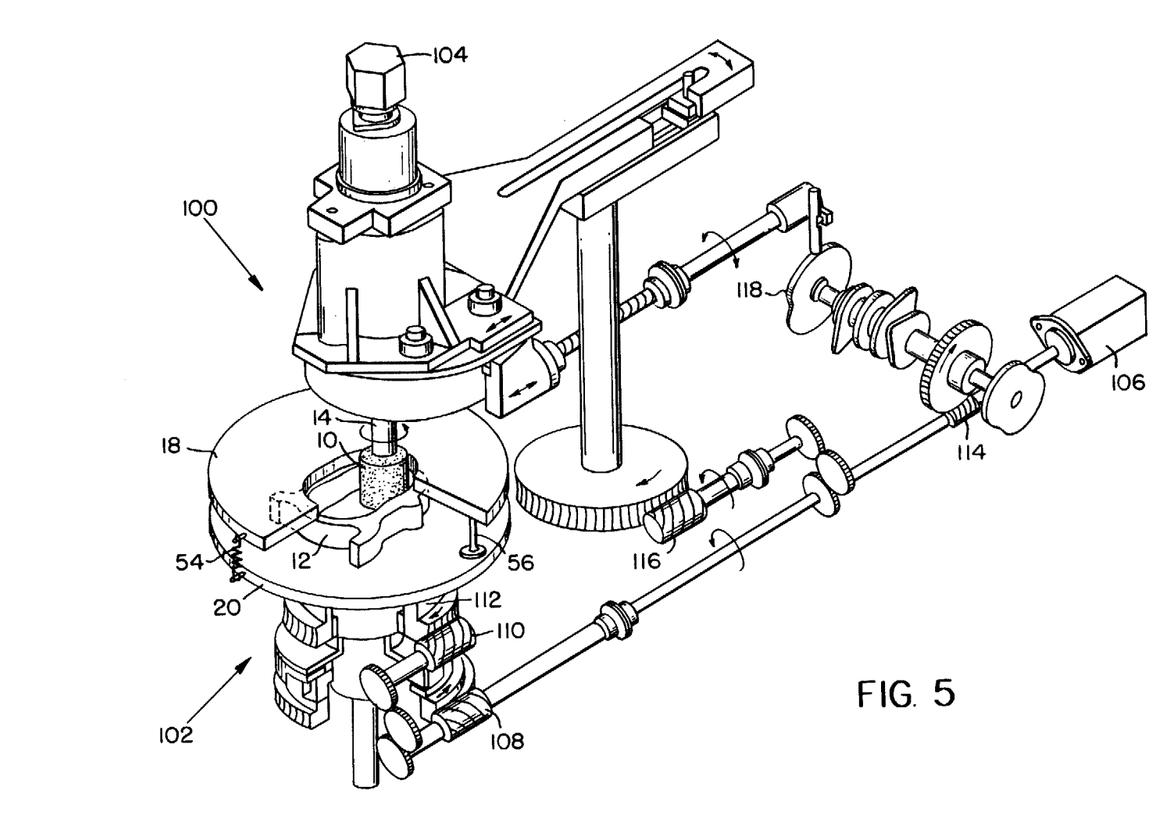
FIG. 5 is an isometric view of a drive train assembly for a generating machine which utilizes the principles of the present invention for finishing an epitrochoidal bore of a rotary piston engine housing.

FIG. 5 illustrates a drive train mechanism for a particular machine tool having a capability for generating an epitrochoidal shape in a combustion chamber housing for a rotary piston engine. The basic generating motions and kinematics of this machine are more fully described in the aforesaid co-pending application, and reference is made thereto for background review of this overall subject matter. The illustrated machine tool includes an upper frame assembly 100 and a lower frame assembly generally indicated at 102. The upper frame assembly includes a vertical tool spindle drive system which carries and drives a working tool 10 on a spindle member 14. A drive motor means 104 drives the wheel spindle 14. The lower frame assembly includes a table means 20 and driving mechanisms for imparting rotation to a workpiece 12 so as to generate a trochoidal shape on an interior surface of the workpiece. As illustrated, a main drive motor 106 drives two worm gears 108 and 110 which are operatively associated with the table means 20. A counterclockwise rotation about the central axis of the trochoid to be generated is dictated by the worm gear 108, and a clockwise rotation is dictated to an eccentrically mounted sleeve 112 by the worm gear 110. The combination of the two motions produces the desired epitrochoidal shape. Additional worm gears 114 and 116 respectively control a series of control cams and a oscillating mechanism for the grinding wheel (to correctly position the grinding wheel surface relative to any given point of curvature of the generated epitrochoidal shape). A control cam 118 functions to change the feed position of the grinding wheel 10 relative to the surface being finished, and this permits an adjustment of force of the grinding wheel 10 on the work surface in accordance with relative motion between the grinding wheel and the workpiece and position of the grinding wheel relative to the workpiece. The features of the present invention which are discussed above with reference to FIGS. 1-4 can be seen in their relative positions in the overall mechanism illustrated in FIG. 5.

Having described a preferred embodiment of the present invention, it can be appreciated that novel structures have been provided for accurately adjusting a working tool relative to a previously formed surface so that extremely uniform and controlled amounts of stock can be removed from the previously formed surface. Although the above discussion has emphasized a particular application of the invention to problems encountered in finishing previously ground surfaces in rotary engine chambers, it can be appreciated that the basic principles of the invention can be applied to other machining and finishing requirements. Thus, it is contemplated that other forms of working tools, such as mills and rotating cutter heads can be modified and used in accordance with certain of the above teachings.

Changes and modifications in the above described features of the present invention which are fully equivalent to those which have been discussed above are intended to be included within the scope of protection of the claim definitions which follow. For example, a workpiece can be clamped downwardly onto a displaceable surface of a work table, and the spring elements 56 can be moved into and out of fixed receiving structures, if desired. Similar such changes and modifications will be obvious to those skilled in this art.

We claim:

1. In a stock removing machine of the type in which a working tool is mounted and rotated about an axis of a rotatable spindle for being brought into contact with a surface of a workpiece supported for rotation relative to the working tool, the improvements in said machine which comprise:

first resilient means interconnecting the working tool with said rotatable spindle to permit limited angular displacement of the axis of the working tool relative to its axis of rotation when an angular force develops between the working tool and the rotatable spindle, a supporting means for said workpiece, including (a) a table means which can be rotated to impart rotation to the workpiece, (b) a holding means spaced from said table means for suspending the workpiece out of contact with the table means, and (c) coupling means interposed between said table means and said holding means for preventing relative angular rotation between the table means and the holding means while permitting radial displacement between the table means and the holding means, and second resilient means in the form of spring elements interconnected between said table means and said holding means for permitting limited radial displacement of the workpiece relative to the axis of rotation of said working tool for the purpose of developing a predetermined radial force between the working tool and the workpiece so that the workpiece can precisely adjust its position according to a previous shape of said surface of said workpiece.

2. The improvement of claim 1 wherein said first resilient means comprises a diaphragm element having radial rigidity and axial flexibility relative to the axis of rotation of said working tool.

3. The improvement of claim 1 wherein said working tool comprises a grinding wheel means having a cylindrical grinding surface for engaging a surface of a workpiece, and wherein said first resilient means comprises a diaphragm element for suspending said grinding wheel means from a portion of a rotatable spindle which is driven to impart a rotation to the grinding wheel means.

4. The improvement of claim 1 wherein said last named spring elements comprise a plurality of beam spring means mounted between said table means and said holding means.

5. The improvement of claim 4 and including means for disengaging selected beam spring means from operative contact between the table means and the holding means.

6. The improvement of claim 1, and including tool feed means for moving said working tool toward and away from said workpiece during a stock removing operation, said tool feed means being timed with a rotation of the workpiece to vary the normal force between the working tool and the workpiece in a predetermined manner.

7. In a stock removing machine of the type in which a working tool is mounted and rotated about an axis for being brought into contact with a surface of a workpiece supported on a table means for rotation relative to the working tool, the improvement comprising a holding means for securing said workpiece relative to said table means, resilient means in the form of a plurality of beam spring structures interposed between said holding means and said table means to permit limited radial movement of the holding means relative to the table means to develop and maintain a predetermined radial force between the working tool and the workpiece, and individual members of said plurality of beam spring structures having free end portions which can be brought into and out of engagement with receiving structures associated with said holding means or said table means, and including control means for selectively actuating said individual members into and out of engagement relative to respective receiving structures to thereby adjust the force between said workpiece and said working tool at selected positions on said workpiece surface.

* * * * *